STEREOPHONIC SIGNAL TRANSMISSION AND RECEPTION SYSTEM

Filed Feb. 9, 1959 2 Sheets-Sheet 1

INVENTORS
WILSON P. BOOTHROYD
EDGAR M. CREAMER, JR.
BY
Robert D. Sanborn
ATTORNEY Oct. 18, 1966 W. P. BOOTHROYD ETAL 3,280,260

STEREOPHONIC SIGNAL TRANSMISSION AND RECEPTION SYSTEM

Filed Feb. 9, 1959 2 Sheets-Sheet 2

INVENTORS
WILSON P. BOOTHROYD
EDGAR M. CREAMER, JR.

BY Robert D. Sanborn
ATTORNEY 3,280,260
STEREOPHONIC SIGNAL TRANSMISSION AND RECEPTION SYSTEM Wilson P. Boothroyd, Huntingdon Valley, and Edgar M. Creamer, Jr., Melrose Park, Pa., assignors, by mesne assignments, to Philco Corporation, Philadelphia, Pa., a corporation of Delaware Filed Feb. 9, 1959, Ser. No. 792,070
14 Claims. (Cl. 179—15)

The present invention relates to stereophonic signal transmission systems and more particularly to improved signal transmitting and receiving means for such systems.

The stereophonic reproduction at a distance of any program requires that the sound be picked up at two or more spaced points at the originating location and supplied to two or more spaced reproducers at the distant location. In order to preserve the stereophonic effect it is necessary to provide the equivalent of two or more separate signal channels from the originating locotion to the remote location. In the interest of economy and because the available radio frequency spectrum is limited it is desirable that the necessary signal channels be provided by existing radio and television broadcasting systems within their allotted frequency bands. Further in the interest of economy and to insure complete compatibility with existing monaural receivers now in use for receiving signals from these radio and television stations, it is desirable that the equivalent of the two separate signal channels be supplied by a single radio or television channel.

Various systems for multiplexing the two stereophonic signals on a single radio frequency channel, either as separate signals or a sum and difference signals derived from the original signals, have been proposed in the prior art. However, each of the systems heretofore proposed suffers from one or more of the following disadvantages: (a) they are not compatible with existing monaural receivers, (b) they require greater bandwidth than is now allotted to radio and television channels (or the maximum modulation frequency must be severely limited to stay within the allotted channel), (c) one or both of the channels has a relatively poor signal-to-noise ratio, and (d) complex systems are required for generating and/or receiving the multiplex signal.

Therefore it is an object of the present invention to provide a system for broadcasting and receiving stereophonic program signals which is compatible with existing monaural receivers and which may be accommodated within channels presently assigned to radio and television stations.

Another object of the present invention is to provide a system for the stereophonic transmission of program signals over a single frequency modulation channel which provides a signal-to-noise ratio in each channel which is comparable to the signal-to-noise ratio obtainable with monaural broadcasts from the same radio or television station.

A further object of the present invention is to provide a system for broadcasting and receiving stereophonic program signals which does not require complex systems for generating and receiving the multiplex signal.

In general these and other objects of the present invention are achieved by providing a transmitter means which comprises, in combination with a source of first and second program signals, means for combining said program signals to provide signals in a first frequency band which are representative of the algebraic sum of the two program signals and signals in a substantially adjacent frequency band which are equivalent to the lower sideband components only of the algebraic difference of said program signals modulated on a subcarrier signal. Means are also provided to suppress the higher frequency components of said lower sideband signal equivalent, i.e. those components which are equivalent to the low frequency components of the program signal, thereby to provide a separation between the highest frequency component of said lower sideband signal component and the frequency of said subcarrier signal. The signals in said two bands may be employed to modulate in amplitude, phase or frequency a carrier signal at the frequency assigned to a radio or television station. The signal thus formed may be received by a monaural receiver as a monaural signal. Stereophonic reception of the composite signal may be achieved by receiving systems including one or more synchronous detectors with or without matrixing.

For a better understanding of the present invention together with other and further objects thereof reference should now be made to the following detailed description which is to be read in conjunction with the accompanying drawings in which.

Figure 1:
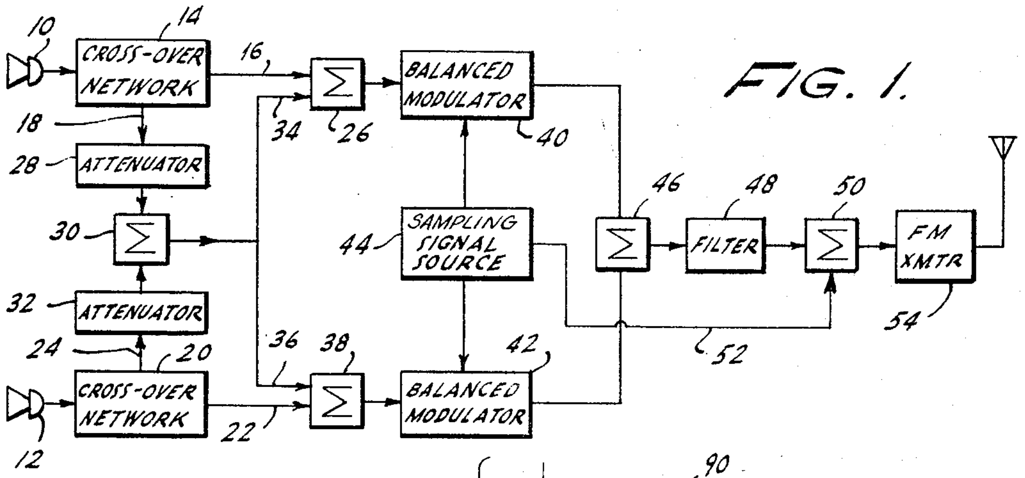
FIG. 1 is a block diagram of a stereophonic signal transmitter arranged in accordance with the present invention.

Referring now to FIG. 1 the stereophonic program signal inputs 10 and 12 are represented by microphones. It should be understood however that the signal inputs 10 and 12 may also take other forms such as the stereophonic pickup assembly of a disc reproducer or the reading heads of a tape reproducer. In the description which follows inputs 10 and 12 will be referred to as the A and B signal inputs, respectively. In the embodiment of the invention shown in FIG. 1 the signal from signal input 10 is supplied to a crossover network 14. Crossover network 14 may be a circuit of the type commonly employed in audio amplification systems which will supply high frequency components of the input signal to output lead 16 and low frequency components of the input signal to output lead 18. The crossover frequency for network 14 is preferably chosen to be between 300 and 500 cycles.

The signal from signal input 12 is passed through a second crossover network 20 which preferably is identical in its signal transfer characteristic to network 14 so that the high frequency components appear in output lead 22 and the low frequency components in output lead 24. Crossover networks 14 and 20 may include a sloping amplitude vs. frequency characteristic to provide preemphasis of the high frequency components of the program signal if desired. The high frequency components from signal input 10 which appear at connection 16 are supplied to one input of an adder circuit 26. The low frequency components from source 10 is supplied through an attenuator 28 to an adder network 30. Similarly the low frequency signals derived from pickup 12 which appear on lead 24 are supplied through an attenuator 32 to a second input of adder 30. The output signal from adder 30 is supplied to a second input 34 of adder circuit 26. It is also supplied to one input 36 of a second adder circuit 38. The second input to adder circuit 38 is provided by the output lead 22 from crossover network 20. Adder circuits 26, 30 and 38 may comprise a simple resistive network for algebraically adding the signals supplied to the two inputs thereof. In other instances electronic amplifying devices such as vacuum tube or transistor amplifier stages having a common load impedance may be employed to provide isolation between the two input connections and the output connection. Attenuator 28 has an attenuation ratio such that the net gain for low frequency components via network 14, attenuator 28 and adders 30 and 26 to the output of adder circuit 26 is equal to approximately one-half the net gain for high frequency signals via the network 14 and adder 26. If circuits 14, 26, 28 and 30 are all passive circuits the gain may be less than one for both channels. Attenuator 32 establishes a similar gain ratio between signal input 12 and the output of adder 38.

It can be seen from the block diagram of FIG. 1 that the output signal from adder circuit 26 comprises the high frequency components of the A signal derived from source 10 and the common low frequency components derived from sources 10 and 12. In the description that follows this signal is referred to as the A′ signal. Similarly, the output of adder circuit 38 comprises the high frequency components of the B signal derived from source 12 and the common low frequencies for sources 10 and 12. This signal is hereinafter referred to as the B′ signal. The signals from adder circuits 26 and 38 are supplied to a pair of carrier balanced modulator circuits 40 and 42. Modulators 40 and 42 are supplied with a periodic sampling or switching signal from a source 44. Source 44 provides a signal which has a frequency equal to approximately twice the frequency of the highest frequency component present in the output signals of adders 26 and 38. Source 44 supplies the periodic sampling signal to modulator 40 in one phase and to modulator 42 in the opposite phase. It has been established that in the sound channel of a television program subjectively very little is gained by including audio frequency components above 7,500 cycles per second. Therefore it is possible to employ a sampling signal having a frequency equal to or slightly greater than 15,000 cycles per second. Since the frequency of the horizontal synchronizing signal is approximately 15,750 cycles per second it is convenient to use this signal as the sampling signal. This particular feature is disclosed and claimed in the copending application of Alfred C. Matthews, Serial No. 771,815, filed November 4, 1958, now Patent No. 3,071,643. Therefore in a stereophonic television transmitter the source 44 may comprise the source of horizontal synchronizing signals in the video channel.

The output signals of balance modulators 40 and 42 are supplied to an adder circuit 46. The combined signal appearing at the output of adder circuit 46 is passed through a filter 48 to a reference signal insertion circuit which is shown in FIG. 1 as an adder circuit 50. A second input of adder circuit 50 is supplied with a signal by way of connection 52 from the sampling signal source 44. The purpose of inserting the sampling signal at this point is to provide a phase reference signal for the demodulator at the receiver. Again, if the system shown in FIG. 1 is to be employed in conjunction with a television system in which the horizontal synchronizing signal is employed as the reference signal, adder 50 and connection 52 may be omitted since the horizontal synchronizing signal is transmitted to the receiver in the video channel of the composite television signal.

The output of filter 48 or adder 50 is supplied to the input of a frequency modulated transmitter 54 which includes the usual means for generating a carrier signal at the frequency assigned to the transmitting station and the means for deviating this frequency in response to the signals supplied thereto from adder 50 or filter 48.

The adder networks 26, 30, 38, 46 and 50, attenuators 28 and 32, and filter 48 have been shown as separate blocks in FIG. 1 in order that the operation of the system of FIG. 1 may be more readily understood. In practice, however, two or more of these circuit components may be combined, such as by selecting the impedance values of adder 30 so that it supplies the attenuation now represented by the separate attenuators 28 and 32. Similarly adder circuits 26 and 38 may be made a part of the input coupling networks of carrier balanced modulators 40 and 42.

The operation of the system of FIG. 1 will be explained with reference to the spectrum plots and characteristic curves of FIGS. 2 through 4. Two extreme conditions of operation of the system of FIG. 1 are (1) there is a signal present on input 10 or input 12 and no signal is present at the other input, i.e. there is a maximum difference between the two input signals and (2) the same signal is supplied to inputs 10 and 12, i.e. there is no difference between the input signals. Also of interest is the intermediate condition, which is most commonly encountered in practice, in which finite but unequal signals are supplied to the two pickups 10 and 12. The condition in which a signal is present at input 10 but no signal is present at input 12 will be described first. It will be assumed by way of example that the signal at input 10 may at one time or another contain audio frequencies equal to some selected peak amplitude in a range comparable to present day practice in monaural signal transmission. For example in television sound systems the frequency range may be from 50 to 7,500 cycles per second while in high fidelity frequency modulation systems the range may be from 50 to 15,000 cycles per second. The possible spectrum for the signal is represented by the curve 60 at A in FIG. 2. In explaining the operation of the system it is convenient to assume that the entire spectrum is present at all times at maximum amplitude though this condition is rarely encountered in practice. Crossover network 14 passes the high frequency portion of the A signal from pickup 10 directly to the adder 26. The low frequency components, say below 300 to 500 cycles, are supplied to adder 26 by way of attenuator 28 and adder 30. Since under the conditions assumed for this example there is no B signal at input 12, the signal on input 34 to adder 26 will comprise only the low frequency components of the A signal reduced in amplitude by attenuator 28. The A′ signal at the output of adder 26, which is the input to carrier balanced modulator 40, is shown by spectrum plot 62 of FIG. 2B.

The output of adder 30 is also supplied to input 36 of adder 38. Since there is no B signal there is no signal on input 22 of adder 38. Therefore B′ signal at the output of adder 38 and the input signal of modulator 42 will be shown by spectrum plot 64 of FIG. 2C.

As mentioned above, source 44 supplies modulators 40 and 42 with a periodic signal which has a frequency which is assumed to be slightly greater than twice the highest program frequency to be transmitted. If desired this signal supplied by source 44 may have a sinusoidal waveform. The periodic sampling signal from source 44 is supplied to modulator 40 in one phase and to modulator 42 in the opposite phase. Periodic signals having waveshapes other than sinusoidal may be employed provided the above limitation on phase is observed.

Modulators 40 and 42 in effect time sample the A′ and B′ signals supplied thereto and supply the modulation products or the time samples to adder 46. It can be shown that the output signal from adder 46 includes signals at audio frequencies which are representative of the sum of the two signals at the output of adders 26 and 38, respectively, and signals at higher frequencies which are representative of the difference between these two signals. For example, let it be assumed that source 44 supplies oppositely phased sine waves of unity amplitude to modulators 40 and 42 and that the signals supplied by adders 26 and 38 are sampled during the positive half cycles only of the sampling signals supplied to the respective modulators. The Fourier representation of the half-wave sampling signal which is effective in modulator 40 is $$\frac{1}{\pi}\left(1+\frac{\pi}{2}\cos\omega_s t+\tfrac{2}{3}\cos 2\omega_s t-\tfrac{2}{15}\cos 4\omega_s t\right) \quad (1)$$

and the corresponding representation of the half-wave sampling signal which is effective in modulator 42 is $$\frac{1}{\pi}\left(1-\frac{\pi}{2}\cos\omega_s t+\tfrac{2}{3}\cos 2\omega_s t-\tfrac{2}{15}\cos 4\omega_s t\right) \quad (2)$$

If the signal supplied by adder 26 is $$L \sin \omega_L t \quad (3)$$

and the signal supplied by adder 38 is $$R \sin \omega_R t \quad (4)$$

then the signal at the output of modulator 40 will be the product of (1) and (3) while the output signal of modulator 42 is the product of (2) and (4).

Thus the output signal of modulator 40 may be expressed as $$L \sin \omega_L t \frac{1}{\pi}\left(1+\frac{\pi}{2}\cos\omega_s t+\tfrac{2}{3}\cos 2\omega_s t-\tfrac{2}{15}\cos 4\omega_s t\right) \quad (5)$$

and the output of modulator 42 may be expressed as $$R \sin \omega_R t \frac{1}{\pi}\left(1-\frac{\pi}{2}\cos\omega_s t+\tfrac{2}{3}\cos 2\omega_s t-\tfrac{2}{15}\cos 4\omega_s t\right. \quad (6)$$

The output signal of adder 46 is the sum of (5) and (6) which may be expressed as $$\frac{1}{\pi}(\sin\omega_L t+R\sin\omega_R t)+(\tfrac{1}{2}L\sin\omega_L t\cos\omega_s t-\tfrac{1}{2}R\sin\omega_R t \cos\omega_s t)+(\text{terms including only multiples of } \omega_s t) \quad (7)$$

Factoring out the expression $\frac{1}{2}\cos\omega_s t$ from the second term of (7) and neglecting terms involving multiples of $\omega_s t$ Equation 7 becomes $$\frac{1}{\pi}(L\sin\omega_L t+R\sin\omega_R t)+\tfrac{1}{2}\cos\omega_s t(L\sin\omega_L t-R\sin\omega_R t) \quad (8)$$

It will be seen that the expression within the parentheses of the first term of Equation 8 represents an audio frequency signal proportional to the sum of the signals supplied by adders 26 and 38 and that the second term represents a signal which is the difference of the two signals supplied by adders 26 and 38 amplitude modulated on signal supplied by source 44. A similar analysis may be made for sampling waves of different form, for example square waves or narrow pulse sampling waves. No signal at the frequency of the signal supplied by source 44 is present at the output of modulators 40 and 42 since these modulators are balanced to suppress this signal.

Since in the example now under discussion only the A signal is present at signal input 10, the signal at the output of adder 46 will have the spectrum shown in FIG. 2D. Envelope 66 represents the sum signal mentioned above while envelopes 68 and 70 represent the difference signals. Broken line 72 represents the frequency of the sampling signal supplied by source 44. Broken line 72 also represents the subcarrier signal of which envelopes 68 and 70 are the lower and upper sidebands, respectively. It should be noted that envelopes 68 and 70 differ from envelope 66 in that no low frequency components are present in envelopes 68 and 70. Since the low frequency input at modulator 40 is the same as the low frequency input to modulator 42 regardless of the nature of the input signal, there will always be a gap between the envelopes 68 and 70 which is equal to twice the crossover frequencies of networks 14 and 20. This is an important feature of the present invention since it greatly simplifies the design of filter 48. The separation of envelopes 68 and 70 and the absence of the subcarrier signal at location 72 avoids low frequency distortion which might result from unequal phase shifts in the sloping portion 76 of the filter characteristic of filter 48 which is shown in FIG. 2E. It has been found that because of the simplification of the filter circuit 48 which is made possible by the suppression of all signals in the region between envelope 68 and envelope 70 it is preferable to suppress the subcarrier frequency signals by employing carrier balanced modulators 40 and 42 and then to reinsert a phase reference signal by means such as adder 50 rather than derive the phase reference signal from modulators 40 and 42.

FIG. 2F represents the signal supplied to the transmitter 54. Envelopes 78 and 80 in the spectrum of FIG. 2F correspond to envelopes 66 and 68 of FIG. 2D. Line 82 represents the phase reference signal inserted by adder 50. As pointed out previously, in television systems which employ the horizontal synchronizing signal or a signal derived therefrom as the modulating frequency, the transmission of the signal 82 is not required. In systems in which the phase reference signal is transmitted it is preferably transmitted at the lowest level which will afford reliable phase and frequency information at the receiver. Since the addition of this phase reference signal increases the peak amplitude of composite signal supplied by adder 50, a larger reference signal than necessary will needlessly increase the deviation range of the signal from transmitter 54. It is believed that this phase reference signal may have an amplitude at least 20 db below the peak amplitude of the composite signal from adder 46 with full audio modulation by equal signals in the A and B channels.

As mentioned above, transmitter 54 may be any convenient circuit for modulating a station carrier signal with the signal received from adder circuit 50. Since circuits of this type are well known they require no detailed description. As will be explained in more detail presently the signal supplied by adder 50 is particularly well suited to frequency modulation transmission systems and to television systems which employ frequency modulation in the transmission of the sound channel. For this reason transmitter 54 has been shown as a frequency modulation transmitter.

FIGS. 3A–3D illustrate the operation of the system of FIG. 1 with two equal signals supplied to pickups 10 and 12. The frequency spectrum 90 of FIG. 3A now represents the signal at either input 10 or 12. FIGS. 3B and 3C represent the signals at the outputs of adders 26 and 38, respectively. It should be noted that each of these signals contains a common low frequency spectrum 92 representing the sum of the low frequency components of the A and B signals but separate high frequency spectra 94 and 96. The spectrum at the output of adder 46 is shown at 98 in FIG. 3D. Since there is no difference between the A and B signals at signal inputs 10 and 12, and hence no difference in the A' and B' signals at the output of adders 26 and 38, there will be no difference signals centered about the frequency 72 of the signal supplied by source 44.

Figures 2, 3, 4:
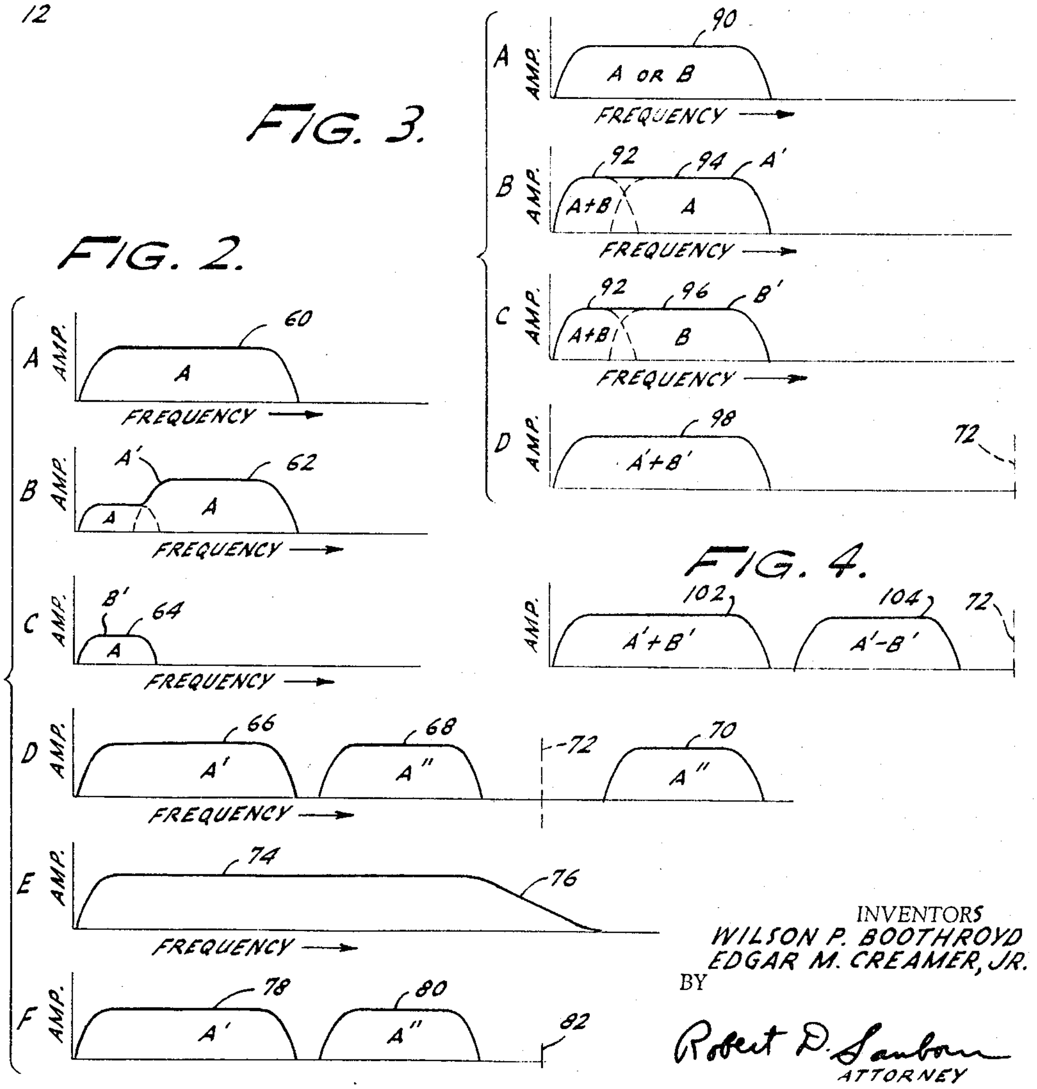
FIG. 2 is a series of spectrum plots which illustrate the operation of the present invention with a single input signal to one channel.
FIG. 3 is a similar series of spectrum plots for equal signals on the two input channels of FIG. 1.
FIG. 4 is a plot of the output signal spectrum of the system of FIG. 1 with signals of unequal amplitude applied to the two signal inputs.

FIG. 4 represents the signal which will appear at the output of filter 48 for unequal signals at inputs 10 and 12, that is signals which differ in amplitude, frequency or phase. Envelope 102 in the spectrum of FIG. 4 again represents the sum of the two input signals supplied by adders 26 and 38 to modulators 40 and 42 while envelope 104 represents the difference of the two input signals to modulators 40 and 42.

One very important feature of the present invention is that the addition of stereophonic information at inputs 10 and 12 does not increase the frequency deviation at the output of transmitter 54. If the deviation of the transmitter 54 is set to the desired value for monophonic operation of the system of FIG. 1, that is with identical signals on the inputs 10 and 12, this deviation will not be exceeded if there is a difference between the signals supplied to inputs 10 and 12. Therefore it is possible to make maximum use of the entire band allotted to the transmission of the stereophonic signal without the danger of infringing on adjacent bands if large differences occur between the signals supplied to inputs 10 and 12.

A further very important feature of the present invention is that the signal bandwidth required at the input to transmitter 54 to represent the two stereophonic signals is less than twice the highest frequency present in either of the two input signal channels if no phase reference signal is transmitted and only slightly greater than twice the maximum frequency in either input channel if a phase reference signal is transmitted. In systems employing a difference signal frequency modulated on a subcarrier, a bandwidth equal to at least three times the highest frequency to be transmitted is required. The bandwidth requirement of the system of FIG. 1 is less than the bandwidth required to transmit the two stereophonic signals individually since there are no components in the difference signal corresponding to the low audio frequency signal. Furthermore the bandwidth of the signal at the input of the transmitter 54 is a function only of the frequency of the signal to be transmitted. In certain prior art systems, for example systems in which a difference signal is frequency modulated on a subcarrier, the bandwidth at the input to the transmitter may be a function of signal amplitude as well as frequency.

Because the present invention incorporates the features mentioned above, it is possible to achieve a much higher deviation ratio for the same radio frequency bandwidth at the output of transmitter 54 than can be achieved in previously proposed stereophonic frequency modulation systems. The higher deviation ratio possible with the system of the present invention results directly in the better signal-to-noise ratio at the receiver.

The relatively restricted bandwidth required by the system of FIG. 1 is particularly advantageous in the stereophonic transmission of television sound signals and in the stereophonic transmission of signals over a single frequency modulation channel. In television systems, program signals to a frequency of 7,500 cycles per second may be transmitted while staying well within the limits assigned to the sound channel. Further, the horizontal synchronizing signal may be employed as the phase reference signal thus making it unnecessary to transmit a separate reference signal. In single channel frequency modulation systems, program signals to 15,000 cycles per second may be transmitted utilizing only a portion of the 75,000 cycle bandwidth assigned to each frequency modulation channel. The remaining portion of the channel may be employed for the presently existing and profitable dual monophonic special service (storcasting) or the like.

The fact that the system of FIG. 1 is completely compatible with monaural receivers is clearly shown by spectra 78, 98, and 102 of FIGS. 2F, 3D and 4, respectively. As shown in these figures, the signal below the highest program frequency, i.e., those signals which are within the passband of the monaural receiver, always represent the sum of the signals supplied to pickups 10 and 12. Therefore a monaural receiver tuned to a signal being transmitted by the system of FIG. 1 will receive all of the program information and not merely the portion coming from one pickup as is the case in many prior art systems. In most instances the limited bandwidth of monaural frequency modulation home receivers and the sound channel of television receivers will exclude the difference signals represented by envelope 80, for example, in FIG. 2D from the speaker system of the monaural receiver. Any monaural receiver having a bandwidth wide enough to pass a portion of the difference frequencies may be modified to restrict the bandwidth slightly so that only the sum signals are passed to the speaker.

Figure 5:
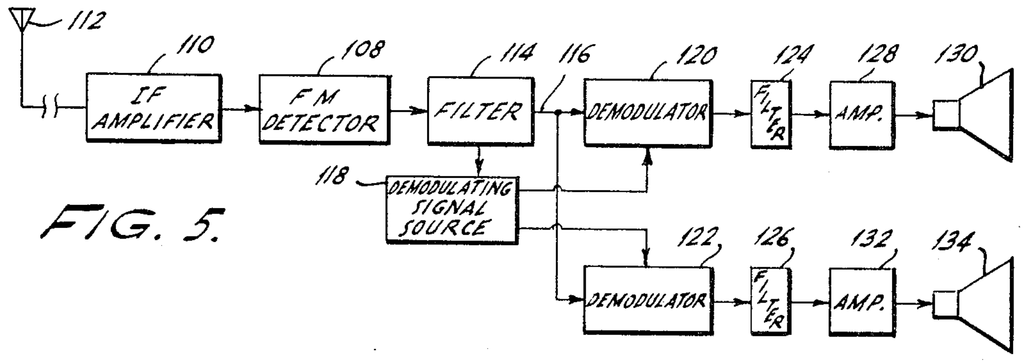
FIG. 5 is a block diagram of a stereophonic receiver capable of demodulating the signal supplied by the transmitter system of FIG. 1.

Stereophonic reception of the signal transmitted by the system of FIG. 1 is readily achieved by means of the system of FIG. 5. The system from antenna 112 to the frequency modulation detector or discriminator 108 may follow commercial frequency modulation receiver practice, so only antenna 112, intermediate frequency amplifier 110 and detector 108 have been shown in FIG. 5. Filter 114, which is coupled to the output of detector 108, passes to point 116 signal components in the frequency band between zero and the modulating frequency source employed at the transmitter. In addition, in a frequency modulation receiver the reference demodulation signal added at the transmitter is supplied by filter 114 to demodulating signal source 118. Signal source 118 may be a locked oscillator or other suitable carrier regeneration circuit which will generate a signal having the same frequency and phase as the reference demodulation signal.

The signals at output 116 of filter 114 are supplied in the same phase to two demodulators 120 and 122. The demodulating signal source 118 supplies a demodulating signal to demodulator 120 in a first phase and the same demodulating signal to demodulator 122 in the opposite phase.

Low pass filters 124 and 126 which are coupled to the outputs of demodulators 120 and 122 remove all components of the signal which lie above one-half the frequency of the demodulating signal supplied by source 118. An amplifier 128 and a signal transducer such as a loudspeaker 130 are provided for generating a sound signal representative of the signal supplied by filter 124. A second amplifier 132 and speaker 134 are connected to the output of filter 126.

It is believed that the circuit of FIG. 5 requires no detailed explanation since receivers of this general type have been employed in the time multiplex art to accommodate two independent signals on one channel. As is well known in the time multiplex art, if the frequency and phase of the signal supplied to demodulator 120 from source 118 correspond to the frequency and phase of the signal supplied to modulator 40 of FIG. 1 by source 44, then the signal appearing at the output of filter 124 will correspond exactly to the A′ signal appearing at the output of adder 26 at the transmitter. Under these conditions the signal appearing at the output of filter 126 will correspond to the B′ signal appearing at the output of added 38 at the transmitter. Thus speaker 130 will reproduce the high frequency components of the A signal originally supplied to signal input 10 at the transmitter plus the combined low frequency components of the A and B signals supplied to signal inputs 10 and 12. Speaker 134 will reproduce the high frequency components of the B signal supplied to signal input 12 and the combined low frequency components of the A and B signals supplied to signal inputs 10 and 12. It has been demonstrated that placing the common low frequency components on both speakers produces no noticeable degradation in the stereophonic effect. Further it is believed that in some instances it may give a more pleasing subjective effect than placing the full range of signals on one speaker and only high frequency components on another speaker as is done in certain prior art systems.

Figure 6:
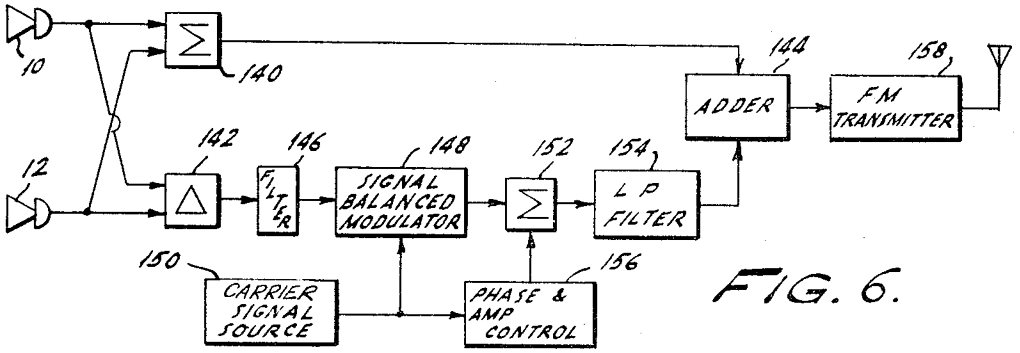
FIG. 6 is a block diagram of a second transmitter arranged in accordance with the present invention.
Figure 7:
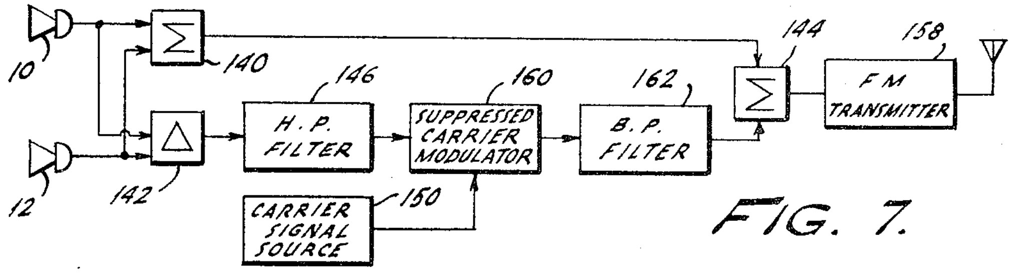
FIG. 7 is a block diagram with still another transmitter arranged in accordance with the present invention.

FIGS. 6 and 7 illustrate alternative means for generating a signal resembling the signal produced by the system of FIG. 1. In FIG. 6 signal inputs 10 and 12 are each connected to both an adder circuit 140 and a subtracter circuit 142. The output of adder circuit 140 is supplied directly to one input of a second adder 144. The output of the subtracter circuit 142 is passed through a high pass filter 146 to a signal balanced modulator 148. Filter 146 may have a cut-off frequency of the order of 300 to 500 cycles. Modulator 148 is supplied with a carrier signal from a source 150 which may correspond to any one of the circuits mentioned for source 44 of FIG. 1. The output of modulator 148 is supplied through an adder circuit 152 and a low pass filter 154 to a second input of adder 144. The upper cut-off frequency for filter 154 is preferably equal to or slightly less than the frequency of the signal supplied by source 150. The carrier signal from source 150 is supplied through a phase and amplitude control circuit 156 to a second input of adder 152. The output of adder 144 is supplied to a frequency modulated transmitter 158 which may correspond to the transmitter 54 of FIG. 1.

The system of FIG. 6 operates as follows. Adder 140 forms directly the spectrum 102 shown in FIG. 4. Subtracter 142 forms a similar spectrum for the difference between the signals supplied to signal inputs 10 and 12. Filter 146 removes the low frequency component from the difference signals and thus forms a suitable signal for modulating the signal supplied by source 150 to produce upper and lower sideband spectra of the type shown at 104 in FIG. 4. Since modulator 148 is balanced for the signal supplied by filter 146 the output of this modulator will include a carrier frequency component and upper and lower sidebands thereof but no components at the frequencies present in the original difference signal supplied by filter 146. Circuit 156 supplies a signal at the carrier frequency which is in direct phase opposition to the carrier frequency component present in the output of modulator 148 and equal in amplitude to this carrier frequency component. Thus the carrier frequency component which is present in the output of modulator 148 is suppressed in adder 152. As pointed out above, the carrier component is suppressed in television systems since it is not needed for synchronizing purposes at the receiver. In frequency modulation systems the carrier is at least partially suppressed to ease the phase shift requirements of filter 154. In a frequency modulation system a small amount of residual carrier may be provided by adjusting the phase and/or amplitude control of circuit 156 or a demodulating reference signal may be supplied by source 150 to a third input of adder 144 or to any convenient point in transmitter 158. As mentioned above, the carrier level should be kept as low as possible in order to minimize the total peak amplitude of the composite signal. However it should not be made so low that the carrier signal will be obscured by noise at the receiver. The function of filter 154 is to remove the upper sideband component which is present in the output of adder 152. Filter 154 may have a characteristic similar to the one shown in FIG. 2E except that the passband need not extend to near zero frequencies since there are no components below a frequency equal to approximately one-half the frequency of the signal supplied by source 150. It should now be apparent that the signal supplied by adder 144 to transmitter 158 is approximately equivalent to the signal appearing at the output of filter 48 of FIG. 1.

In the system shown in FIG. 6 filter 146 may have a band pass characteristic if desired. The upper cut-off frequency may be selected so that the lowest frequency of the difference sideband which appears at the output of the adder 144 is above the audio passband of the monaural receivers normally served by the transmitter of FIG. 6. The additional spectrum space made available by limiting the maximum frequency passed by filter 146 may be left as a guard band between the sum signal from adder 140 and the lower sideband signal passed by filter 154. Alternatively, the signals passed by adder 140 may be permitted to extend to a frequency which is more than one-half the frequency of the signal supplied by source 150. It will be remembered that removing any frequency component from the difference channel results in the appearance of this frequency component at both speakers of the stereophonic receiver. Thus the quality of the received signal at the stereophonic receiver is not changed as a result of the frequency limitation of the difference channel at the transmitter. The slight loss of stereophonic effect which may be present is usually not objectionable. As another alternative, filter 146 may be given a band pass characteristic and the frequency of source 150 reduced to a value which is less than twice the highest frequency in the output of adder 140. If the frequency of the signal supplied by source 150 is at least as great as the frequency of the highest frequency component in either channel plus the frequency of the highest frequency component to be reproduced stereophonically there will be no overlapping of the signals from adder 140 and filter 154.

The system of FIG. 7 is similar to the system of FIG. 6 and like parts have been identified by the same reference numeral. The system of FIG. 7 differs from the system of FIG. 6 in the manner in which the carrier component of the modulated signal is suppressed. In FIG. 7 the signal balanced modulator 148 is replaced by a carrier balanced or suppressed carrier modulator 160. The output of a modulator 160 is supplied to adder 144 through a band pass amplifier 162. Filter 162 must pass only the lower sideband signal present in the output of modulator 160 and discriminate against the original difference signal components which also appear at the output of modulator 160.

Figure 8:
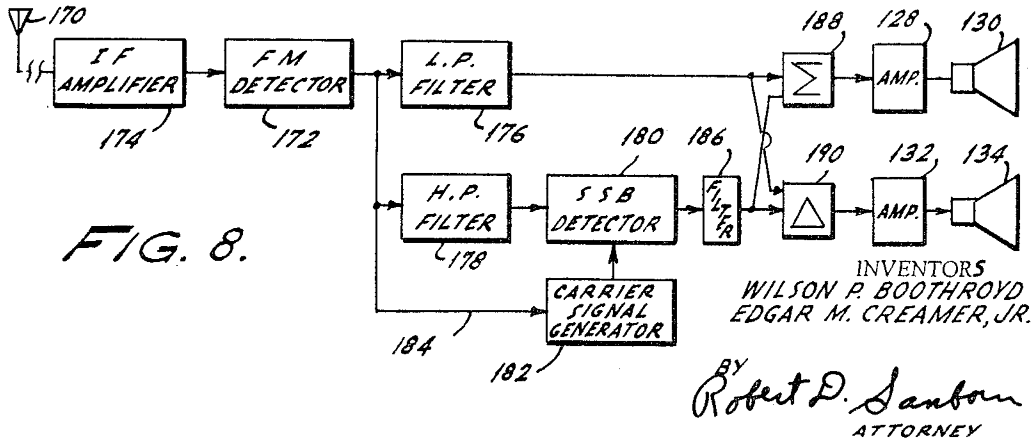
FIG 8. is a block diagram of a second form of stereophonic signal receiver capable of demodulating the stereophonic signals provided by the transmitter systems of FIGS. 1, 6 and 7.

FIG. 8 illustrates an alternative and non-equivalent system for providing a stereophonic reproduction from the signal provided by any one of the systems shown in FIG. 1, 6 or 7. In the system of FIG. 8 the selection and connection of the components from antenna 170 through detector 172 and including intermediate frequency amplifier 174 may follow conventional receiver practice. A low pass filter 176 is coupled to the output of mixer 172 for separating out the $A'+B'$ component of the received signal represented by envelope 102 of FIG. 4. A high pass filter 178 is also connected to the output of detector 172. Filter 178 passes the $A'+B'$ signal represented by the spectrum 104 of FIG. 4 and the demodulating reference signal, if present. The output of filter 178 is supplied to a single sideband detector circuit 180. The carrier signal necessary for single sideband detection is provided by carrier signal generator 182. In a television receiver generator 182 may comprise the horizontal sync separation circuits of the video channel or an oscillator circuit synchronized thereby. In a frequency modulation receiver it may comprise a locked oscillator or equivalent circuit which is caused to operate at the proper frequency and phase by the demodulation reference signal supplied by a connection 184 from detector 172 to carrier signal generator 182. A low pass filter 186 connected to the output of detector 180 passes only the $A'-B'$ components of the detected signal which lie in the audio band to be reproduced.

The $A'+B'$ signal from filter 176 and the $A'-B'$ signal from filter 186 are supplied to an adder circuit 188 which algebraically combines the two input signals supplied thereto to recover the A' signal. Amplifiers 128 and 130 of FIG. 8 correspond to similarly numbered components in FIG. 5.

The $A'+B'$ signal from filter 176 and the $A'-B'$ signal from filter 186 are also supplied to a subtracter circuit 190 which provides a signal equal to the difference of the two signals supplied thereto. This difference is proportional to the B' signal alone. Amplifier 132 and speaker 134 which are connected to the output of subtracter 190 again correspond to similarly identified components of FIG. 5. The amplifiers 128 and 132 preferably include the usual de-emphasis networks.

The operation of the receiver of FIG. 8 is believed to be apparent from the foregoing description. The sum signal from filter 176 and the demodulated difference signal from filter 186 are combined in adder circuit 188 to provide a signal which is equivalent to the A′ signal which appears at the output of adder 26 in the transmitter circuit of FIG. 1. The signal from adder 188 will contain the common low frequencies of each of the two input channels since they are present in the $A'+B'$ signal which is passed by filter 176.

Subtracter 190 combines the signals from filters 176 and 186 to provide a signal equivalent to the B′ signal appearing at the output of adder 38 in the system of FIG. 1. Thus the signal appearing at the output of subtracter 190 will include the high frequency components of the B signal, that is the signal supplied to input 12 plus the common low frequency components of the A and B signals.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What we claim is:

1. In a stereophonic signal transmission system, the combination comprising a program signal source for providing at first and second outputs, respectively, first and second audio frequency stereophonic program signals, signal combining means coupled to said first and second outputs, said signal combining means including means for combining said program signals to provide signals in a first frequency band which are representative of the additive combination of said two program signals, and signals in a substantially adjacent frequency band which are equivalent to the lower sideband components only of a subtractive combination of selected frequency components of said program signals amplitude modulation on a subcarrier signal, said first frequency band corresponding to the frequency band occupied by said first and second stereophonic program signals, said signal combining means further including filter means for restricting said selected frequency components of said program signals to components having frequencies higher than *n* cycles per second, where *n* is a frequency in the range of 100–500 cycles per second, a source of carrier frequency signal and modulator means coupled to said signal combining means and said source of carrier frequency signal for frequency modulating said carrier frequency signal with said signals in said first and second frequency bands.

2. In a stereophonic signal transmission system the combination comprising a program signal source for providing at first and second outputs, respectively, first and second audio frequency stereophonic program signals, a source of a periodic signal having a frequency higher than the frequency of the highest frequency component of said program signals, signal combining means including signal modulator means responsive to said periodic signal and said first and second program signals and signal adder means coupled to said signal modulator means for providing signals of first frequency band which are representative of the additive combination of said two program signals and signals in a second frequency band which are equivalent to the lower sideband components only of a subtractive combination of selected frequency components of said program signals amplitude modulated on said periodic signal, said first frequency band corresponding to the frequency band occupied by said first and second stereophonic program signals, said signal combining means further including filter means for restricting said selected frequency components to the components of said program signals having frequencies higher than *n* cycles per second where *n* is a frequency in the range of from 100–500 cycles per second, a source of carrier frequency signal and means coupled to said source of carrier frequency signal and said signal adder means for frequency modulating said carrier frequency signal with said signals in said first frequency band and said signal components in said second frequency band corresponding to said selected frequency components.

3. The combination of claim 2 wherein said source of periodic signal provides a periodic signal having a frequency equal to approximately twice the frequency of the highest possible frequency component of said program signals.

4. In a stereophonic signal transmission system, the combination comprising first means for providing first and second audio frequency program signals, a source of periodic signal providing at first and second outputs first and second periodic signals of equal frequency and opposite phase, said periodic signals having a frequency equal to at least twice the frequency of the highest frequency component of either program signal, first amplitude modulating means, first signal coupling means coupling said first output of said source of periodic signal to said first modulating means, second signal coupling means coupling said first means to said first amplitude modulating means, said second signal coupling means including means for supplying said first program signal and the low frequency components of said second program signal to said first modulating means, second amplitude modulating means, third signal coupling means for coupling said second output of said source of periodic signals to said second modulating means, fourth signal coupling means coupling said first means to said second modulating means, said fourth signal coupling means including means for supplying said second program signal and the low frequency components of said first program signal to said second modulating means, signal adder means for additively combining the output signals of said first and second modulating means, a source of carrier frequency signal, third modulating means, said third modulating means being a frequency modulating means, and means for supplying to said third modulating means said carrier frequency signal and components of said output signal of said signal adder means which lie below a frequency which is less than the frequency of said periodic signal by a low audio frequency.

5. In a stereophonic signal transmission system, the combination comprising program signal source means for providing first and second audio frequency program signals, first means coupled to said program signal source means for adding a signal representative of the low frequency components of said second program signal to said first program signal thereby to provide a first modified program signal, second means coupled to said program signal source means for adding a signal representative of the low frequency components of said first program signal to said second program signal thereby to provide a second modified program signal, a periodic signal source providing at first and second outputs first and second periodic signals of opposite phase, said periodic signals having a frequency equal to at least twice the frequency of the highest frequency component of either program signal, first amplitude modulating means, means for supplying to said first amplitude modulating means said first periodic signal and said first modified program signal, second amplitude modulating means, means for supplying to said second amplitude modulating means said second periodic signal and said second modified program signal, means for additively combining the output signals of said first and second amplitude modulating means, a source of carrier frequency signal, a frequency modulating means, means for supplying to said frequency modulating means said carrier frequency signal and components of said output signal of said signal combining means which lie below a frequency which is less than the frequency of said periodic signal by a low audio frequency.

6. In a stereophonic signal transmission system, the combination comprising, means for providing first and second audio frequency program signals, means for adding a signal representative of the low frequency components of said second program signal to said first program signal thereby to provide a first modified program signal, means for adding a signal representative of the low frequency components of said first program signal to said second program signal thereby to provide a second modified program signal, first and second carrier balanced amplitude modulator means, a periodic signal source having first and second outputs, said source providing at said first output a periodic signal at a first phase, and at said second output a periodic signal having a phase opposite to said first phase, said periodic signals having a frequency equal to at least twice the frequency of the highest frequency component of either program signal, means for supplying said first modified program signal and said periodic signal at said first phase to said first balanced amplitude modulator means, means for supplying said second modified program signal and said periodic signal at said phase opposite to said first phase to said second balanced amplitude modulator means, signal combining means coupled to the output of said first and second balanced modulator means for additively combining the output signals of said first and second balanced modulator means, a source of carrier frequency signal, a frequency modulator means, and means for supplying to said frequency modulator means said carrier frequency signal and the components of said output signal of said signal combining means which lie below a frequency which is less than the frequency of said periodic signal by a low audio frequency.

7. A transmitter for a stereo FM transmission system comprising: means for developing first and second audio signals A and B; a signal generator for generating a signal S having a fundamental frequency substantially higher than the highest audio frequency to be transmitted; means for effectively multiplying said audio signals with said signal S to develop a suppressed-carrier amplitude-modulated subcarrier signal, the frequency of said subcarrier being equal to the frequency of said signal S, said signal generator including means for developing a phase reference signal having a phase and frequency representative of the phase and frequency of said subcarrier signal, and transmission means including a carrier signal generator for generating a carrier signal, frequency modulation means, and means for applying the sum of said A and B signals, said phase reference signal and at least the lower sideband portion of only the fundamental component of said amplitude-modulated subcarrier signal to said frequency modulation means thereby to generate a transmission signal comprising a carrier signal frequency-modulated by said sum of said A and B signals, said phase reference signal and at least the lower sideband portion of only the fundamental component of said amplitude modulated subcarrier signal.

8. A transmitter for a stereo FM transmission system in accordance with claim 7 in which said frequency modulation means modulates said carrier signal with said phase reference signal to a maximum of 10 percent of the total possible modulation.

9. A transmitter for a stereo FM transmission system comprising: means for developing first and second audio signals A and B; a signal generator for generating a switching signal having a fundamental frequency substantially higher than the highest audio frequency to be transmitted, said signal generator including means for developing a signal S of substantially sine-wave form at the fundamental frequency of said switching signal; means for independently multiplying said switching signal, with said audio signals, in phase opposition, to develop a suppressed-carrier amplitude-modulated signal, the frequency of said subcarrier being equal to the frequency of said signal S, said signal generator including means for developing a phase reference signal having a phase and frequency representative of the phase and frequency of said subcarrier signal; and transmission means including a carrier signal generator for generating a carrier signal, frequency modulation means, and means for applying said carrier signal, the sum of said A and B signals, said phase reference signal and at least the lower sideband portion of only the fundamental component of said amplitude-modulated subcarrier signal to said frequency modulation means thereby to generate a transmission signal comprising a carrier signal frequency-modulated by said sum of said A and B signals, said phase reference signal and at least the lower sideband portion of only the fundamental component of said amplitude modulated subcarrier signal.

10. A stereo FM transmission system comprising: means for developing a first audio signal A and a second audio signal B; means for generating a signal S having a fundamental frequency which is substantially higher than the highest audio frequency to be transmitted; means for effectively modulating said A and B audio signals and said signal S to develop a suppressed-carrier amplitude-modulated subcarrier signal; transmission means for generating a transmission signal comprising a carrier frequency modulated in accordance with a modulation function which is representative of the sum of said subcarrier signal, the sum of said A and B audio signals, and at least the lower sideband portion of only the fundamental component of said amplitude-modulated subcarrier signal, means for receiving said frequency-modulated carrier including a discriminator for deriving therefrom a composite modulation signal corresponding to said modulation function; a demodulator having an input circuit coupled to said discriminator and having two output circuits for deriving signals of the form $K_4A$ and $K_5B$, respectively, where $K_4$ and $K_5$ are constants; means responsive to the subcarrier signal portion of said composite modulation function for deriving a demodulating signal so related to said composite modulation function that its modulation therewith yields modulation products including terms $K_4A$ and $K_5B$; and means for concurrently applying said signal supplied by said discriminator and said demodulating signal to said demodulator.

11. A receiver for a stereo FM transmission system for utilizing a transmitted signal comprising a carrier frequency-modulated by the additive combination of a first signal comprising the sum of first and second audio signals A and B, a second signal comprising at least the lower sideband portion of only the fundamental component of a subcarrier signal amplitude-modulated by the difference of said audio signals A and B, and a third signal comprising a pilot signal of a frequency related to the fundamental component of said subcarrier signal, said receiver comprising: a discriminator; input means for applying a received signal to said discriminator to develop a signal corresponding to the modulation function of said carrier; means, comprising a filter coupled to said discriminator, for generating a switching signal of constant phase and having a fundamental frequency equal to the frequency of said subcarrier; a switching device, having an input circuit coupled to said discriminator and having two output circuits, for applying a signal from said input circuit to said output circuits in alternation in response to an applied signal; and means for applying said switching signal to said switching device to control the switching operation therein and develop a pair of audio signals, corresponding to said audio signals A and B, in said output circuit.

12. A receiver for a stereo FM transmission system for utilizing a transmitted signal comprising a carrier frequency-modulated by the additive combination of a first signal comprising the sum of first and second audio signals A and B, a second signal comprising at least the lower sideband portion of only the fundamental component of a subcarrier signal amplitude-modulated by the difference of said first and second audio signals A and B, said receiver comprising: a discriminator; input means for applying a received signal to said discriminator to develop a signal corresponding to the modulation function of said carrier; means coupled to said discriminator for generating a switching signal of constant phase and having a fundamental frequency equal to the frequency of said subcarrier; a switching device, having an input circuit coupled to said discriminator and having two output circuits, for applying a signal from said input circuit to said output circuits in alternation in response to an applied signal; and means for applying said switching signal to said switching device to control the switching operation therein and develop a pair of audio signals, corresponding to said audio signals A and B, in said output circuits.

13. A receiver for a stereo FM transmission system for utilizing a transmitted signal comprising a carrier frequency-modulated by the additive combination of a first signal comprising the sum of first and second audio signals A and B, a second signal comprising at least the lower sideband portion of only the fundamental component of a subcarrier signal amplitude modulated by the difference of said first and second audio signals A and B, and a third signal comprising a pilot signal of a frequency related to said fundamental frequency component of said subcarrier signal, the average amplitude levels of said first and second signals being substantially equal, said receiver comprising: a discriminator; input means for applying a received signal to said discriminator to develop a signal corresponding to said additive combination which comprises the modulation function of said carrier; a demodulator having an input circuit coupled to said discriminator and having two output circuits for deriving signals of the form $K_1A$ and $K_2B$, respectively, where $K_1$ and $K_2$ are constants; means responsive to said third signal component for deriving a demodulating signal of constant phase so related to the modulation of said carrier that its modulation with the signal supplied by said discriminator yields modulation products including terms $K_1A$ and $K_2B$; and means for concurrently applying said signal supplied by said discriminator and said demodulating signal to said demodulator.

14. A receiver for a stereo FM transmission system for utilizing a transmitted signal comprising a carrier frequency-modulated by the additive combination of a first signal comprising the sum of first and second audio signals A and B, a second signal comprising at least the lower sideband portion of only the fundamental component of a subcarrier signal amplitude modulated by the difference of said first and second audio signals A and B, and a third signal comprising a pilot signal of a frequency related to said fundamental frequency component of said subcarrier signal, the average amplitude level of said first and second signals being substantially equal, said receiver comprising: a first signal translation channel including a discriminator, input means for applying the received signal to said discriminator to develop a signal corresponding to said additive combination which comprises the modulation function of said carrier, means for deriving from the output of said discriminator a program signal representing only the A audio signal, and amplifying and sound reproducing means for utilizing said A signal; and a second signal translating channel including said discriminator, said input means for applying the received signal to said discriminator to develop a signal corresponding to said modulation function, means for deriving from the output signal of said discriminator a program signal representing only the B audio signal, and amplifying and sound reproducing means for utilizing said B signal.

References Cited by the Examiner

UNITED STATES PATENTS

| | | | |
|---|---|---|---|
| 2,261,628 | 11/1941 | Lovell | 179—1.3 X |
| 2,698,379 | 12/1954 | Boelens et al. | 179—15 |
| 2,779,020 | 1/1957 | Wilmotte. | |
| 2,835,889 | 5/1958 | Dyer | 179—15 |
| 2,851,532 | 9/1958 | Crosby | 179—15 |
| 2,960,573 | 11/1960 | Hodgson et al. | 179—15 |
| 3,046,329 | 7/1962 | Reesor | 179—15 X |

FOREIGN PATENTS

| | | |
|---|---|---|
| 205,255 | 11/1956 | Australia. |

OTHER REFERENCES

"A System of Stereophonic Broadcasting," Electronic Engineering, April 1960, pp. 238–239.

DAVID G. REDINBAUGH, *Primary Examiner.*

L. MILLER ANDRUS, ROBERT H. ROSE, *Examiners.*

A. SOPP, W. H. LUSKO, R. L. GRIFFIN, *Assistant Examiners.*